US008535806B2

(12) United States Patent
Huang et al.

(10) Patent No.: US 8,535,806 B2
(45) Date of Patent: Sep. 17, 2013

(54) MEDICAL DEVICE HAVING BONDING REGIONS AND METHOD OF MAKING THE SAME (75) Inventors: I Mark Huang, Pleasanton, CA (US); Michael V. Williamson, Clayton, CA (US)

(73) Assignee: Cordis Corporation

( * ) Notice: Subject to any disclaimer, the term of this patent is extended or adjusted under 35 U.S.C. 154(b) by 30 days.

(21) Appl. No.: 12/888,091

(22) Filed: Sep. 22, 2010

(65) Prior Publication Data

US 2011/0008626 A1   Jan. 13, 2011

Related U.S. Application Data (62) Division of application No. 12/242,088, filed on Sep. 30, 2008, now Pat. No. 8,133,346.

(51) Int. Cl.
*B32B 9/04* (2006.01)
*B32B 27/00* (2006.01)
*B32B 15/04* (2006.01)
*B32B 15/00* (2006.01)
*B32B 9/00* (2006.01)

(52) U.S. Cl.
USPC ........ 428/411.1; 428/422; 428/457; 428/469; 428/685

(58) Field of Classification Search
None
See application file for complete search history.

(56) References Cited

U.S. PATENT DOCUMENTS

| | | | |
|---|---|---|---|
| 3,788,321 A | 1/1974 | Reither et al. | |
| 5,128,101 A | 7/1992 | Boynton | |
| 5,188,714 A | 2/1993 | Davidson et al. | |
| 5,192,323 A * | 3/1993 | Shetty et al. | 623/23.6 |
| 5,275,696 A | 1/1994 | Gaskin et al. | |
| 5,771,555 A | 6/1998 | Eda et al. | |
| 5,997,517 A | 12/1999 | Whitbourne | |
| 6,284,085 B1 * | 9/2001 | Gwo | 156/273.7 |
| 6,447,664 B1 * | 9/2002 | Taskovics et al. | 205/170 |
| 6,569,194 B1 * | 5/2003 | Pelton | 623/1.15 |
| 6,939,593 B2 * | 9/2005 | Wang | 428/36.91 |
| 7,001,421 B2 | 2/2006 | Cheng et al. | |
| 8,133,346 B2 * | 3/2012 | Huang et al. | 156/325 |
| 2002/0138136 A1 | 9/2002 | Chandresekaran et al. | |
| 2004/0172120 A1 * | 9/2004 | Cheng et al. | 623/1.11 |
| 2005/0241736 A1 * | 11/2005 | Bell et al. | 148/565 |
| 2005/0263171 A1 * | 12/2005 | Wu et al. | 134/6 |
| 2007/0148326 A1 | 6/2007 | Hastings et al. | |
| 2007/0239259 A1 * | 10/2007 | Boylan | 623/1.15 |
| 2009/0072199 A1 | 3/2009 | Lewarchik et al. | |

OTHER PUBLICATIONS

Detailed Introduction to Shape Memory Alloys, published by SmartLab, Texas A&M found at http://smart.tamu.ed/overview/smaintro/detailed/detailed.html (p. 1), Retrieved on Dec. 27, 2010.*
Jurgen Falbe, Manfred Regitz, "Rompp Chemie Lexikon", (1991) Georg Thieme Verlag, Stuttgart, XP00256985, pp. 3007-3008.
Jurgen Falbe, Manfred Regitz, "Rompp Chemie Lexikon", (1991) Georg Thieme Verlag, Stuttgart, XP002569866, pp. 2988-2989.
Office Action mailed Feb. 24, 2011 in related U.S. Appl. No. 12/242,088.

* cited by examiner

*Primary Examiner* — Sheeba Ahmed (57) ABSTRACT

Medical devices having bonded joints are disclosed. The bonded joints include two surfaces bonded by a layer of phenoxy resin therebetween. In the preferred embodiments, bonded surfaces include materials that are suitable for medical devices. Most preferably, Nitinol includes at least one bonded surface, however, other preferred materials may include, but are not limited to cobalt chromium, stainless steel, titanium, tantalum, and plastic. An intraluminal device including a plurality of locations with a phenoxy resin layer is also disclosed wherein the phenoxy resin further includes a radioopaque additive, a lubricious additive, or both radioopaque and lubricious additives. Also disclosed is an intraluminal device having contiguous heterogeneous structural elements of metallic members and non-metallic sections that are bonded together by a layer of phenoxy resin therebetween.

8 Claims, 10 Drawing Sheets

MEDICAL DEVICE HAVING BONDING REGIONS AND METHOD OF MAKING THE SAME

CROSS-REFERENCE TO RELATED APPLICATIONS

This application is a divisional of U.S. patent application Ser. No. 12/242,088 filed Sep. 30, 2008 now U.S. Pat. No. 8,133,346, and claims priority thereto under 35 U.S.C. §121.

BACKGROUND OF THE INVENTION

1. Field of the Invention

The present invention relates to medical devices and methods of making medical devices having bonded regions that employ a bonding agent with a secondary hydroxyl functional group. In addition, the present invention relates to intraluminal devices comprised of structural members having a plurality of locations wherein a bonding layer is present and may be comprised of one or more additives, particularly one or more radioopaque and/or lubricious additives. The present invention also relates to intraluminal devices comprised of contiguous heterogeneous structural elements further comprised of metallic members and non-metallic sections that are bonded together by a layer of phenoxy resin therebetween. The present invention also relates to the method of using phenoxy resin as a structural or coating layer.

2. Discussion of the Related Art

The prior art makes reference to the use of alloys such as Nitinol (Ni—Ti alloy), which have shape memory and/or superelastic characteristics, in medical devices that are designed to be inserted into a patient's body such as stents, anchors, fasteners, pins, spinal replacement parts and surgical tools. The shape memory characteristics allow the devices to be deformed to facilitate their insertion into a body lumen or cavity and then be heated within the body so that the device returns to its original shape. Superelastic characteristics, on the other hand, generally allow the metal to be deformed and restrained in the deformed condition to facilitate the insertion of the medical device containing the metal into a patient's body, with such deformation causing a phase transformation. Once within the body lumen, the restraint on the superelastic member can be removed, thereby reducing the stress therein so that the superelastic member can return to its original un-deformed shape by the transformation back to the original phase.

Alloys having shape memory/superelastic characteristics generally have at least two phases. These phases are a martensite phase, which has a relatively low tensile strength and which is stable at relatively low temperatures, and an austenite phase, which has a relatively high tensile strength and which is stable at temperatures higher than the martensite phase.

Shape memory characteristics are imparted to the alloy by heating the metal at a temperature above which the transformation from the martensite phase to the austenite phase is complete, i.e. a temperature above which the austenite phase is stable (the $A_f$ temperature). The shape of the metal during this heat treatment is the shape "remembered". The heat-treated metal is cooled to a temperature at which the martensite phase is stable, causing the austenite phase to transform to the martensite phase. The metal in the martensite phase is then plastically deformed, e.g. to facilitate the entry thereof into a patient's body. Subsequent heating of the deformed martensite phase to a temperature above the martensite to austenite transformation temperature causes the deformed martensite phase to transform to the austenite phase, and during this phase transformation the metal reverts back to its original shape if unrestrained. If restrained, the metal will remain martensitic until the restraint is removed. For medical device purposes, the $A_f$ temperature typically ranges from about 0 degrees Celsius to about 50 degrees Celsius, with a most preferable range being between about 10 degrees Celsius to about 37 degrees Celsius. However, for medical device applications where a purely martensitic behavior is desired, the $A_f$ temperature may be greater than about 37 degrees Celsius. Furthermore, for non-medical applications the $A_f$ temperature may be selected to be any temperature that optimizes the Nitinol stress—strain performance under the intended design conditions.

When stress is applied to a specimen of a metal such as Nitinol exhibiting superelastic characteristics at a temperature above which the austenite is stable (i.e. the temperature at which the transformation of martensite phase to the austenite phase is complete), the specimen deforms elastically until it reaches a particular stress level where the alloy then undergoes a stress-induced phase transformation from the austenite phase to the martensite phase. As the phase transformation proceeds, the alloy undergoes significant increases in strain but with little or no corresponding increases in stress. The strain increases while the stress remains essentially constant until the transformation of the austenite phase to the martensite phase is complete. Thereafter, further increases in stress are necessary to cause further deformation. The martensitic metal first deforms elastically upon the application of additional stress and then plastically with permanent residual deformation.

If the load on the specimen is removed before any permanent deformation has occurred, the martensitic specimen will elastically recover and transform back to the austenite phase. The reduction in stress first causes a decrease in strain. As stress reduction reaches the level at which the martensite phase transforms back into the austenite phase, the stress level in the specimen will remain essentially constant (but substantially less than the constant stress level at which the austenite transforms to the martensite) until the transformation back to the austenite phase is complete, i.e. there is significant recovery in strain with only negligible corresponding stress reduction. After the transformation back to austenite is complete, further stress reduction results in elastic strain reduction. This ability to incur significant strain at relatively constant stress upon the application of a load, and to recover from the deformation upon the removal of the load, is commonly referred to as superelasticity or pseudoelasticity. Elastic tissues in the body have comparable stress-strain characteristics to superelastic Nitinol, thereby making Nitinol a desirable material for use in implantable medical devices.

Additionally, the surface of Nitinol and other appropriate materials may be passivated to form non-porous, inert oxides that offer good biocompatibility. The non-porous inertness of biocompatible surface oxides provide a technical challenge to device designs incorporating the attachment of two Nitinol parts together, or the attachment of Nitinol to other engineering materials such as plastics and other metals.

Conventional adhesives or glues generally do not provide optimal bonding when working with devices comprised of Nitinol or other material having inert passivated oxide surfaces. For the example of joining Nitinol surfaces, welding Nitinol to Nitinol may be a choice, but where the welding process requires other alloying or brazing metals, undesirable collateral changes in superelastic and shape memory properties may occur. Furthermore, the introduction of additional welding or brazing metals may result in a galvanic couple causing corrosion to occur. Moreover, the heat-affected zone adjacent to the weld area may negatively impact the desired superelastic and shape memory characteristics, including fatigue resistance. Surface oxides resulting from the high heat necessary for thermal welding may develop in a manner that compromise surface passivity, thereby causing the need for further material surface conditioning.

The use of friction welding may comparatively reduce the negative changes to the physical characteristics of Nitinol, however friction welding becomes increasingly difficult as the size of the bonded pieces decreases. Furthermore, friction welding is not a viable option for bonding Nitinol to dissimilar materials such as plastics. When working with dissimilar materials, which may include other metals or plastics, bonding options may yet become further limited. For example, the chemical resistant nature of thermoplastics exacerbates the difficulty of creating a good bond with the non-porous, inert oxides present on the surface of passivated Nitinol. Additionally, many adhesives and epoxies tend to be brittle, thereby further limiting the employment of Nitinol's advantageous superelastic and shape memory characteristics in medical device applications.

SUMMARY OF THE INVENTION

The present invention relates to medical devices and methods of making medical devices having bonded regions that employ a bonding agent having a secondary hydroxyl functional group. In one embodiment of the invention, the medical device includes a first member having a first surface with an available surface oxygen and a second member having a second surface with an available surface oxygen. A bonding agent having a secondary hydroxyl functional group with an affinity to form hydrogen bonds with oxygen is cooperatively associated with the first member and the second member in such a manner as to cause the bonding agent to contact the first surface and the second surface, affixing the first member relative to the second member.

The present invention also relates to a method for fabricating a medical device. In one embodiment of the invention, the method includes providing a first member having a first surface with an available surface oxygen and a second member having a second surface with an available surface oxygen. The first member and the second member are affixed to one another by causing a bonding agent to contact the first surface and the second surface, the bonding agent having a secondary hydroxyl functional group with an affinity to form hydrogen bonds with the oxygen present on the surface of the first and the second member.

BRIEF DESCRIPTION OF THE DRAWINGS

The foregoing and other aspects of the present invention will best be appreciated with reference to the detailed description of the invention in conjunction with the accompanying drawings.

DETAILED DESCRIPTION OF THE PREFERRED EMBODIMENTS

The present invention relates to medical devices formed by bonding together two separate components, each having available surface oxygens. In one embodiment of the invention a bonding agent having an affinity for forming hydrogen bonds with the surface oxygen is used to bond the materials. In particular, bonding agents having the requisite characteristics include a secondary hydroxyl functional group.

One particular material used in the manufacture of medical devices having an available surface oxygen is Nitinol alloy. Nitinol alloy is comprised of nickel and titanium at a unique molecular ratio, giving it superelastic and shape memory characteristics. The surface of Nitinol may be passivated to possess stable, non-porous, inert oxides of titanium thus making Nitinol a good alloy for implantable medical devices. However, the same non-porous, inert oxide surface is not readily amenable to the use of chemical bonding agents for creating reliable mechanical joints. Moreover, thermal-bonding methods may negatively influence the surface passivity and the thermally sensitive superelastic/shape memory mechanical properties of Nitinol.

The problem associated with bonding passivated Nitinol or other materials with inert oxide surfaces may be resolved by applying an appropriate bonding agent. One particular appropriate bonding agent having a requisite secondary hydroxyl functional group with an affinity to form hydrogen bonds with oxygen is phenoxy resin. While phenoxy resin is used as an exemplary embodiment, other bonding agents classified as polyhydroxyl ethers, and having the requisite characteristics, may also be suitable as a bonding agent.

Figure 8:
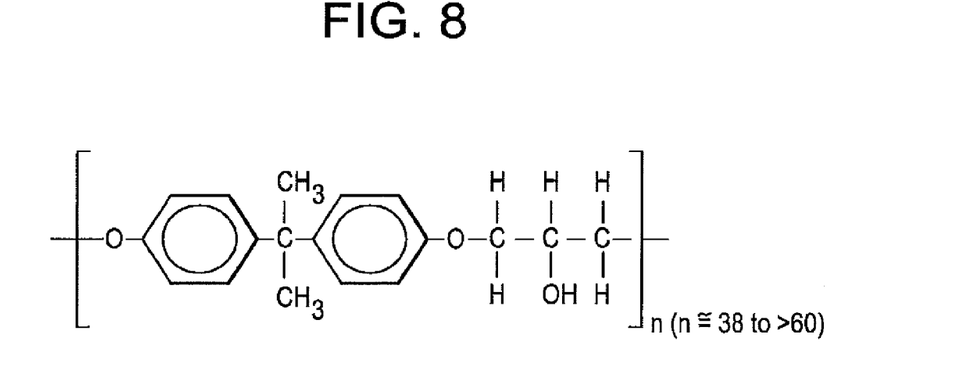
FIG. 8 depicts the chemical structure of a phenoxy resin.
Figure 9:
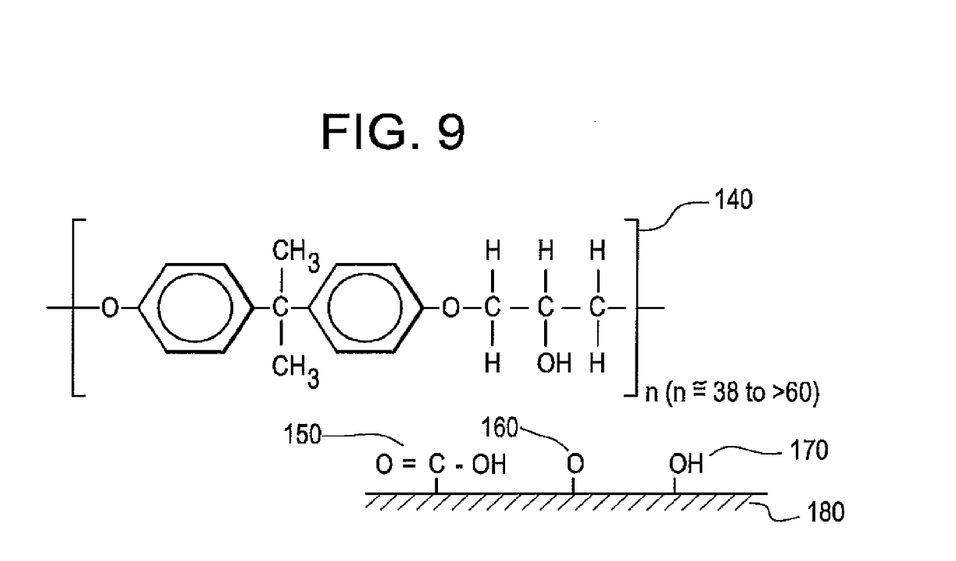
FIG. 9 depicts the chemical structure of a phenoxy resin in proximity to a substrate having available oxygen at is surface.
Figure 9A:
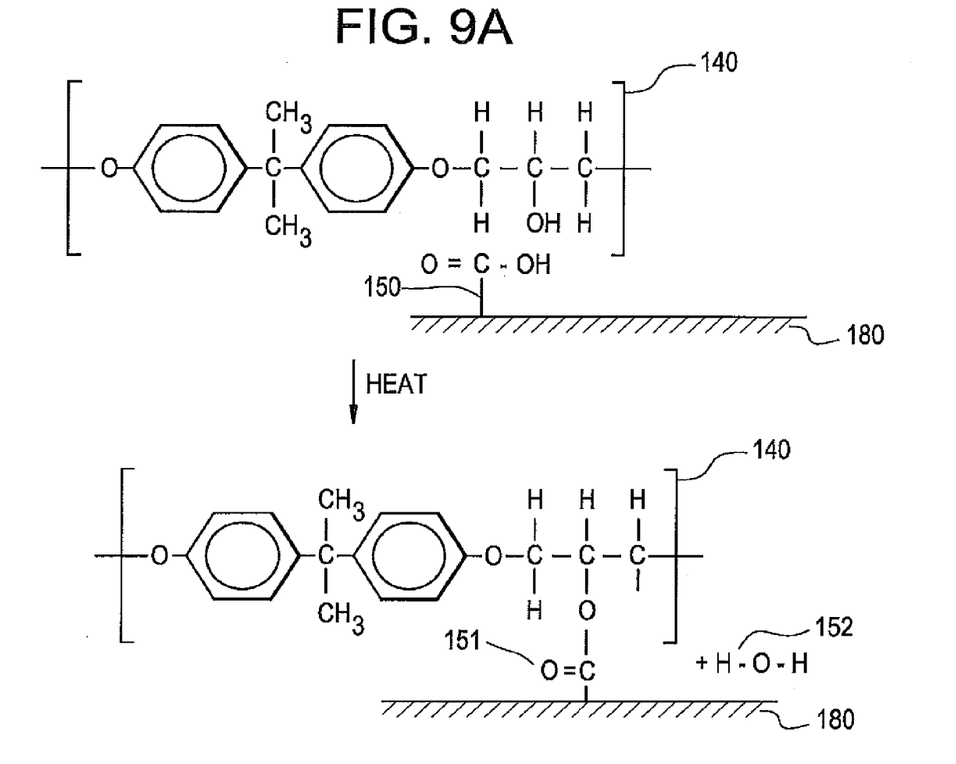
FIG. 9A depicts a hydrogen bond being formed between the hydroxyl functional group in a phenoxy resin and a hydroxyl functional group that provides available oxygen at the surface of the substrate, which may be further strengthened to a covalent polyester linkage with the addition of heat.
Figure 9B:
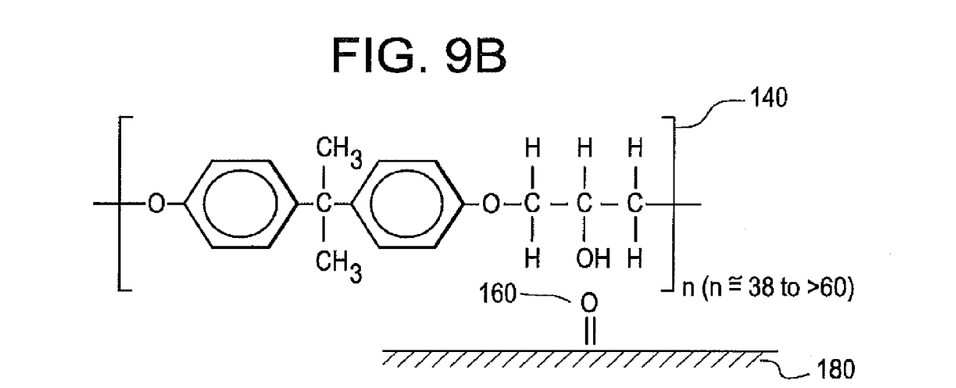
FIG. 9B depicts a hydrogen bond being formed between the hydroxyl functional group in a phenoxy resin and available oxygen at the surface of the substrate.
Figure 9C:
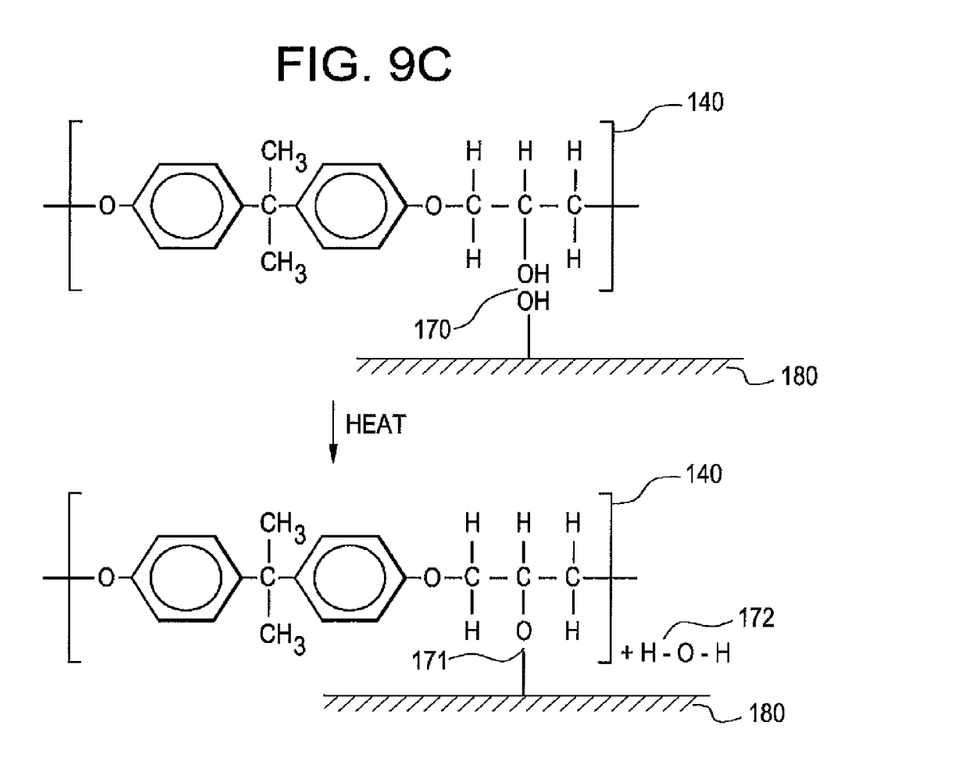
FIG. 9C depicts a hydrogen bond being formed between the hydroxyl functional group in a phenoxy resin and a hydroxyl functional group that provides available oxygen at the surface of the substrate, which may be further strengthened to a covalent ether linkage with the addition of heat.
Figure 10:
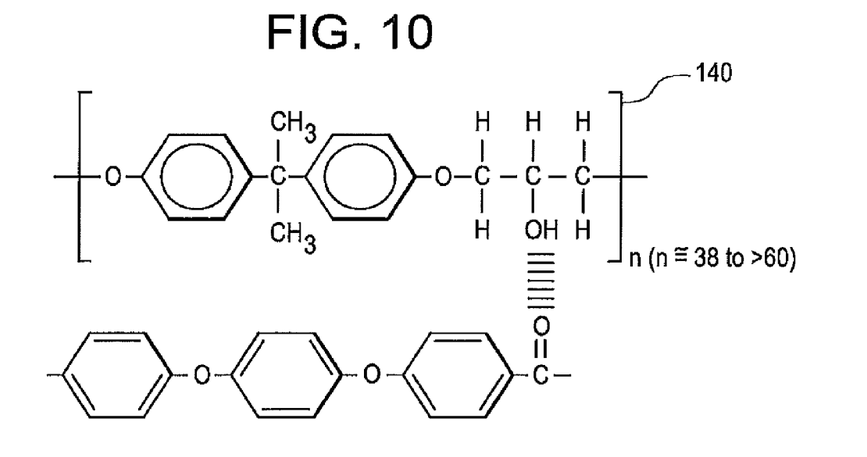
FIG. 10 depicts a hydrogen bond being formed between the hydroxyl functional group in a phenoxy resin and available surface oxygen on a polymer such as PEEK.

The phenoxy resin can be dissolved in most polar solvents such as tetrahydrofuran (THF), methyl ethyl ketone (MEK), dioxane, cyclohexanone, methylpyrrolidone (NMP), methoxypropanol acetate (PM acetate), carbitol solvents, etc. The range of solid content may range from about 0.1% to about 99% per solubility of solvent. As illustrated in FIG. 8, phenoxy resin possesses a secondary hydroxyl functional group having an affinity to form hydrogen bonds with oxygen present on the surface of the material it comes into contact with. This makes phenoxy resin a useful means for adhering materials that otherwise may present difficulty in bonding provided that such materials have available surface oxygen present. Nitinol is a good candidate for use with phenoxy resin. The passive oxide layer that otherwise makes chemical adhesion to passivated Nitinol difficult is a good source of available surface oxygen for bonding using phenoxy resin because of the oxides of titanium present on the Nitinol surface. As is shown in FIG. 9, a substrate possessing available surface oxygen, such as the passive oxide layer on Nitinol, provides a variety of linkage possibilities depending on the nature of the oxygen or oxygen-possessing functional groups such as a hydrocarbon at the surface of the substrate. Moreover, with the addition of heat, bonds may be strengthened from hydrogen (FIG. 9B) to covalent linkages through formations such as ether (FIG. 9C) and polyester (FIG. 9A) linkage structures. FIG. 10 also demonstrates that plastic chemical structures such as the unit structure for PEEK also provide available oxygen for phenoxy resin bonding either through surface preparation or naturally occurring surface oxygen.

Moreover, phenoxy resin may be distinguished from other undesirable members of the group of polymers generally known as polyhydroxyl ethers because the hydroxyl functional group in phenoxy resin is present in ordered repetition within the polymer chain as opposed to being at the end of the polymer chain in other less desirable polyhydroxyl ethers such as epoxies, polyvinyl alcohol, and polyethylene glycol. The net effect of this unique aspect of phenoxy resin is that the hydroxyl functional groups present in phenoxy resin are not directly involved in binding the polymer chain together as it is in other polyhydroxyl ethers. Because of this, phenoxy resin possesses a naturally ability to form stronger bonds with available oxygen present in other materials. The ordered presence of the hydroxyl functional group in phenoxy resin also provides the advantage of creating stronger bonds compared to those of other polyhydroxyl ethers because the bond sites are regularly ordered in a linear manner as opposed to randomly ordered in a non-predictable way. Phenoxy resin is also biocompatible unlike some members of the polyhydroxyl ether family such as phenolic, thereby making phenoxy resin useful for medical device applications.

The hydrogen bond formed by the secondary hydroxyl functional group in phenoxy resin may be further strengthened to a covalent bond between metal oxides or other hydroxyl, carbonyl, or carboxylic functional groups, through the use of any variety of controlled heating methods known in the art, at temperatures below those that cause the negative effects of thermal welding. Such methods may include RF heating, conventional oven heating, laser, infrared sources, and the like. Phenoxy resin may be distinguished from some other polyhydroxyl ethers in this regard because the application of heat to these other less desirable family members does not cause hydrogen bonds to strengthen to covalent bonds, as in the case with Phenoxy resin, but rather the hydrogen bonds tend to decompose with heat. Moreover, unlike some other members of the polyhydroxyl ether family, cross-linking agents may be added to phenoxy resin such that upon the application of heat the bond strength is even further improved. Phenoxy resin is a particularly good candidate for such processing in medical devices because its glass transition temperature ($T_g$), typically within the range from about 70° C. to 100° C., and preferably within the range from about 79° C. to 89° C., is sufficiently high to prevent temperature-induced creep when exposed to sterilization processing methods commonly used for medical devices. The sterilization methods employed for medical devices having bonding regions that include phenoxy resin may be any of those known in the art. Most preferably, an ethylene oxide (EtO) gas process heated to about 60 degrees Celsius is used when the medical device is comprised of a self-expanding luminal implant made with Nitinol. However, other sterilization methods may be employed if the composition of the medical device is compatible with atmospheres other than EtO. Still other sterilization methods may be used depending on the medical device compatibility with such environments. Examples of other sterilization methods may include, for example, an autoclave employing superheated steam up to about 200 degrees Celsius, electron beam sterilization, gamma radiation sterilization, and the like.

The bonding agent may be applied using a variety of means well-known in the art such as spray coating, powder coating, fluidized bed coating, solution dipping, and the like if the underlying substrate has irregular surfaces. To simplify manufacturing, a bonding agent, such as phenoxy resin, may be applied in pre-formed configurations such as extrusions, films, sleeves, molds, or other formats. Pre-formed formats provide the further benefit of obviating the otherwise required use of the aforementioned solvents by using heating as the direct means for bond formation between the phenoxy resin and substrate, making it possible to realize the benefits of the phenoxy resin as a bonding or coating agent with minimized negative environmental impact. Additionally, phenoxy resin may be applied on engineering thermoplastics because the aforementioned hydroxyl, carbonyl, carboxylic functional groups may also be selectively present on the surface of thermoplastic materials. Phenoxy resin provides very good bonding between Nitinol and chromium (chromium oxide), titanium (titanium oxide), and many other tough-to-bond metals because of the affinity of the hydrogen in the secondary hydroxyl functional groups to the oxygen in the oxide layer present on useful engineering alloys. The polymer-based bond between Nitinol and other metals avoids the galvanic couple that may form under other bonding conditions.

As shown in Table 1, phenoxy resin has mechanical properties that allow coated Nitinol surfaces to retain their desirable superelastic and shape memory characteristics. Specifically, the Young's modulus and yield strength of a phenoxy resin coating are sufficiently low, while the elongation to failure is sufficiently high in comparison to Nitinol so as to prevent the suppression of Nitinol's desirable superelastic and shape memory characteristics.

TABLE 1

Mechanical Properties of NiTi and Phenoxy Resin

| Characteristic | Nitinol | Phenoxy Resin |
|---|---|---|
| Young's Modulus | 33 GPa to 41 GPa (martensitic) | 2.6 GPa to 2.8 GPa |
| Yield Strength | 398 MPa (loading plateau) | 82.7 MPa |
| Elongation to Failure | 13.8% | 90% |

In manufacturing pre-formed phenoxy resin formats any configuration may be provided but most preferably in the configurations hereinafter described. Tubes, sheets, threads, rods or other shapes may be co-extruded or co-injected with other materials such as cross-linking agents, radioopaque materials, lubricious materials, bioactives, substrate materials, and the like. Preformed shapes may be further machined or processed to provide dimensional or other physical traits that facilitate the manufacture and performance of the chosen apparatus embodiment.

Figure 1A:
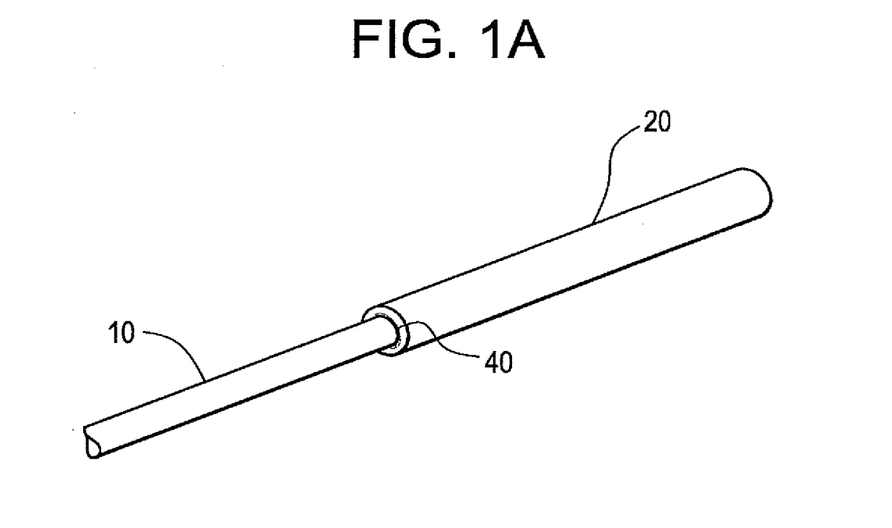
FIG. 1A is a schematic view of an exemplary embodiment wherein a filament is bonded to a tube.
Figure 1B:
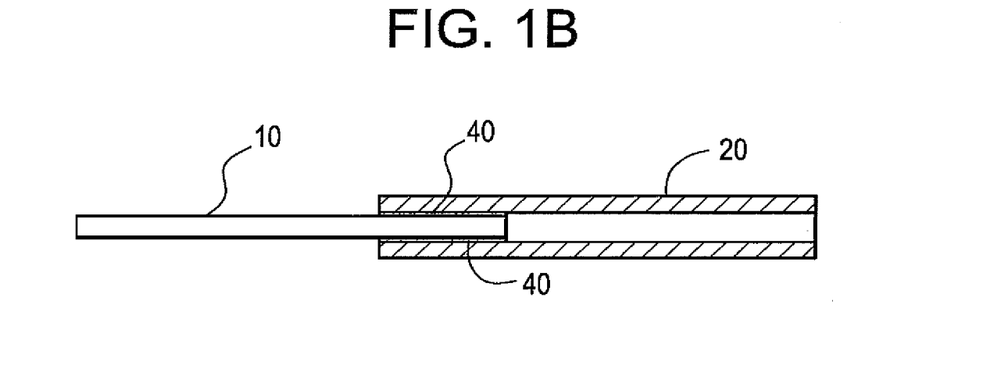
FIG. 1B is a sectional view of the exemplary embodiment shown in FIG. 1A.
Figure 5A:
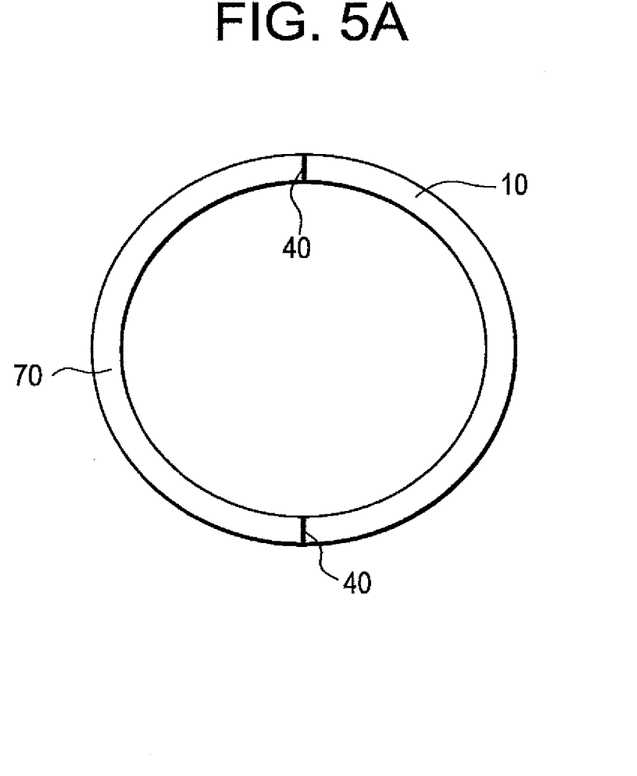
FIG. 5A is a schematic view of an exemplary embodiment wherein one elongate member is bonded to another elongate member using a butt joint.
Figure 5B:
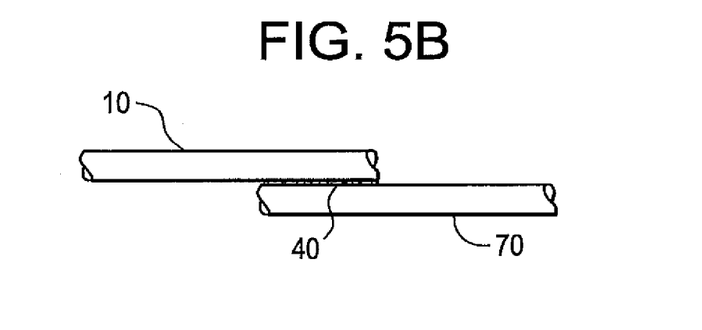
FIG. 5B is a schematic view of an alternate exemplary embodiment of that shown in FIG. 5A wherein a lap joint is formed.

One exemplary embodiment of the present invention uses phenoxy resin to bond a tube to a filament having a solid cross section. The bonded joint is preferably a lap joint but it may alternately be a butt joint. In this embodiment shown in FIG. 1A and FIG. 1B, filament 10 is bonded to tube 20 using a layer of phenoxy resin 40 as the bonding agent. The bond region is most preferably a concentric lap joint wherein filament 10 possesses a cross section sized to fit within the inner diameter of tube 20 such that enough space remains for phenoxy resin layer 40 to be present between the outer surface of filament 10 and the inner surface of tube 20. Alternately, as shown in FIG. 5A, a butt joint may be formed wherein filament 10 may possess a cross section that is either greater or lesser than elongate member 70, or as shown in FIG. 5B, a parallel lap joint may be formed irrespective of the relative cross sectional sizes of filament 10 and elongate member 70.

Filament 10 may be comprised of any engineering material, preferably of a solid cross section at the point of bonding, having surface oxygen available to sufficiently form a hydrogen bond with the secondary hydroxyl group (shown in FIG. 8) present in phenoxy resin layer 40. By way of example, such engineering materials may include preferred metals such as Nitinol, stainless steel, cobalt-chromium, titanium, and tantalum, or plastics comprised of any thermosets and thermoplastics having sufficient surface oxygen amenable to bonding with phenoxy resin layer 40.

Tube 20 may be comprised of any engineering material, of a hollow cross section at the point of bonding, having surface oxygen available to sufficiently form a hydrogen bond with the secondary hydroxyl group (shown in FIG. 8) present in phenoxy resin layer 40. By way of example, such engineering materials may include preferred metals such as Nitinol, stainless steel, cobalt-chromium, titanium, and tantalum, or plastics comprised of any thermosets and thermoplastics having sufficient surface oxygen amenable to bonding with phenoxy resin layer 40.

Elongate member 70 may be comprised of any engineering material, of either a solid or hollow cross section at the point of bonding, having surface oxygen available to sufficiently form a hydrogen bond with the secondary hydroxyl group (shown in FIG. 8) present in phenoxy resin layer 40. By way of example, such engineering materials may include preferred metals such as Nitinol, stainless steel, cobalt-chromium, titanium, and tantalum, or plastics comprised of any thermosets and thermoplastics having sufficient surface oxygen amenable to bonding with phenoxy resin layer 40.

Figure 2A:
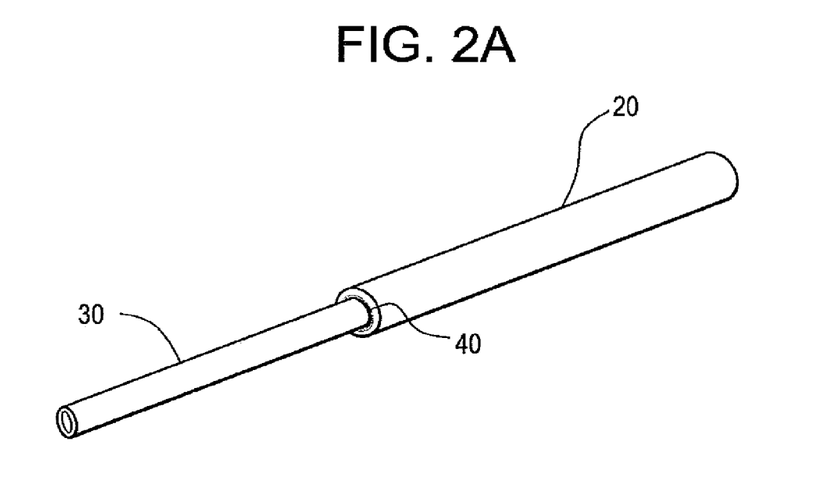
FIG. 2A is a schematic view of an exemplary embodiment wherein a tube is bonded to a tube.
Figure 2B:
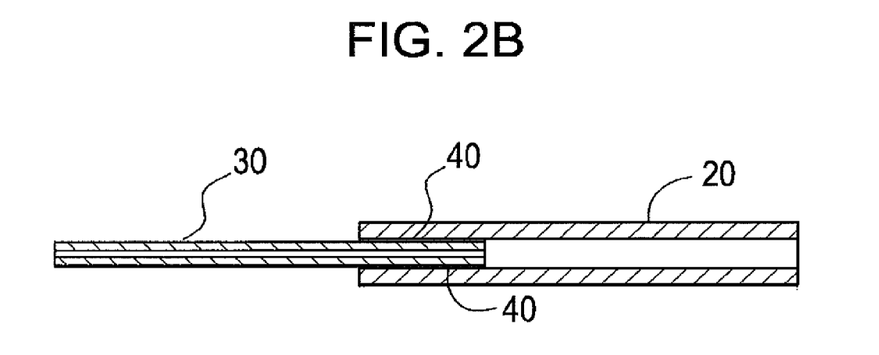
FIG. 2B is a sectional view of the exemplary embodiment shown in FIG. 2A.

Another exemplary embodiment of the present invention uses phenoxy resin to bond a tube to another tube. The bonded joint is preferably a lap joint but it may alternately be a butt joint. In this embodiment shown in FIG. 2A and FIG. 2B, tube 30 is bonded to tube 20 using a layer of phenoxy resin 40 as the bonding agent. The bond region is most preferably a lap joint wherein tube 30 possesses a cross section sized to fit within the inner diameter of tube 20 such that enough space remains for phenoxy resin layer 40 to be present between the outer surface of tube 30 and the inner surface of tube 20.

Tube 30 may be comprised of any engineering material, of a hollow cross section at the point of bonding, having surface oxygen available to sufficiently form a hydrogen bond with the secondary hydroxyl group (shown in FIG. 8) present in phenoxy resin layer 40. By way of example, such engineering materials may include preferred metals such as Nitinol, stainless steel, cobalt-chromium, titanium, and tantalum, or plastics comprised of any thermosets and thermoplastics having sufficient surface oxygen amenable to bonding with phenoxy resin layer 40.

Tube 20 may be comprised of any engineering material, of a hollow cross section at the point of bonding, having surface oxygen available to sufficiently form a hydrogen bond with the secondary hydroxyl group (shown in FIG. 8) present in phenoxy resin layer 40. By way of example, such engineering materials may include preferred metals such as Nitinol, stainless steel, cobalt-chromium, titanium, and tantalum, or plastics comprised of any thermosets and thermoplastics having sufficient surface oxygen amenable to bonding with phenoxy resin layer 40.

Figure 3:
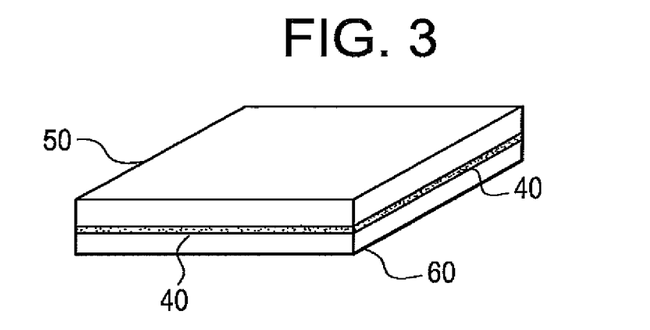
FIG. 3 is a schematic view of an exemplary embodiment wherein a sheet is bonded to another sheet.

Yet another exemplary embodiment of the present invention uses phenoxy resin to bond a first layer to a second layer to form a laminate or a joint. A bonded joint is preferably a lap joint but it may alternately be a butt joint. In this embodiment shown in FIG. 3, a first layer 50 is bonded to a second layer 60 using phenoxy resin layer 40 therebetween to form a laminate or a lap joint. Alternately, a butt joint (not shown) may be formed by bonding the cross sectional faces of layer 50 to layer 60 with phenoxy resin layer 40 therebetween.

Layer 50 may be comprised of any engineering material. The cross section of layer 50 may be of any configuration, which may include solid, patterned, woven, or heterogeneous cross sections at the point of bonding. The bonded surface of layer 50 preferably has surface oxygen available to sufficiently form a hydrogen bond with the secondary hydroxyl group (shown in FIG. 8) present in phenoxy resin layer 40. By way of example, such engineering materials may include preferred metals such as Nitinol, stainless steel, cobalt-chromium, titanium, and tantalum, or plastics comprised of any thermosets and thermoplastics having sufficient surface oxygen amenable to bonding with phenoxy resin layer 40.

Layer 60 may be comprised of any engineering material. The cross section of layer 60 may be of any configuration, which may include solid, patterned, woven, or heterogeneous cross sections at the point of bonding. The bonded surface of layer 60 preferably has surface oxygen available to sufficiently form a hydrogen bond with the secondary hydroxyl group (shown in FIG. 8) present in phenoxy resin layer 40. By way of example, such engineering materials may include preferred metals such as Nitinol, stainless steel, cobalt-chromium, titanium, and tantalum, or plastics comprised of any thermosets and thermoplastics having sufficient surface oxygen amenable to bonding with phenoxy resin layer 40.

Figure 4:
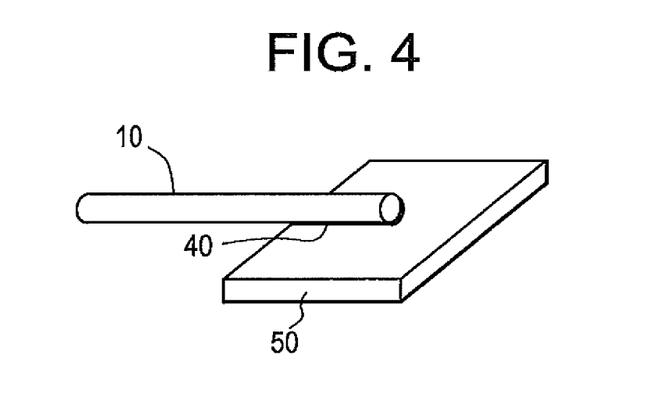
FIG. 4 is a schematic view of an exemplary embodiment wherein an elongate member is bonded to a sheet.

Another exemplary embodiment of the present invention uses phenoxy resin to bond a sheet-like layer to a filament or tube. A bonded joint is preferably a lap joint but it may alternately be a butt joint. In this embodiment shown in FIG.

4, filament 10 is bonded to layer 50 by phenoxy resin layer 40 therebetween. The bond region is preferably a lap joint, but alternately a butt joint (not shown) may be formed by bonding the cross sectional faces of filament 10 to layer 50 with phenoxy resin layer 40 therebetween.

Filament 10 may be comprised of any engineering material, preferably of a solid cross section, but optionally hollow at the point of bonding. Filament 10 possesses surface oxygen available to sufficiently form a hydrogen bond with the secondary hydroxyl group (shown in FIG. 8) present in phenoxy resin layer 40. By way of example, such engineering materials may include preferred metals such as Nitinol, stainless steel, cobalt-chromium, titanium, and tantalum, or plastics comprised of any thermosets and thermoplastics having sufficient surface oxygen amenable to bonding with phenoxy resin layer 40.

Layer 50 may be comprised of any engineering material. The cross section of layer 50 may be of any configuration, which may include solid, patterned, woven, or heterogeneous cross sections at the point of bonding. The bonded surface of layer 50 preferably has surface oxygen available to sufficiently form a hydrogen bond with the secondary hydroxyl group (shown in FIG. 8) present in phenoxy resin layer 40. By way of example, such engineering materials may include preferred metals such as Nitinol, stainless steel, cobalt-chromium, titanium, and tantalum, or plastics comprised of any thermosets and thermoplastics having sufficient surface oxygen amenable to bonding with phenoxy resin layer 40.

Impregnated phenoxy resin coatings provide low cost solutions to the development of lower profile, more radio-opaque medical devices such as self-expanding stents with improved radio-opacity, and/or reduced delivery and recapture forces. Phenoxy resin is an ideal carrier substance for medical device coatings impregnated with radio-opaque materials such as tantalum and bismuth. More particularly, a phenoxy resin may be prepared wherein another material having radio-opaque characteristics is added to the phenoxy resin prior to its application on a device using any of the variety of means known in the art generally referred to herein. The radio-opaque additive may be in any form suitable for incorporation with the resin, but most preferably is in a powder form.

Another exemplary embodiment of the present invention uses phenoxy resin impregnated with a radio-opaque material, most preferably tantalum powder, as a coating for an implantable medical device which may be comprised of any engineering material suitable for implantation, but most preferably superelastic or shape memory Nitinol. The coating may be applied using any variety of means known in the art generally referred to herein. The radio-opaque phenoxy resin coating may be limited to specific locations on the implant device, or the implant device may be entirely coated with radio-opaque phenoxy resin.

Additionally, a phenoxy resin coating may be impregnated with lubricious materials so as to reduce the frictional forces at the surface of a device so coated. A phenoxy resin may be prepared wherein another material having lubricious characteristics is added to the phenoxy resin prior to its application on a device using any of the variety of means known in the art generally referred to herein. The lubricious additive may be in any form suitable for incorporation with the resin, but most preferably is in a powder form. Further, the lubricious additive may be added in combination with radio-opaque additives.

When manufacture is directed toward an embodiment comprising a phenoxy resin surface coating impregnated with an additive, the additive material is combined with the phenoxy resin prior to its application on the surface of the substrate. The phenoxy resin may be applied in fluid or dry form, but is most preferably applied in liquid form.

Another exemplary embodiment of the present invention uses phenoxy resin impregnated with lubricious material, most preferably PTFE powder, as a coating for an implantable medical device which may be comprised of any engineering material suitable for implantation, but most preferably superelastic or shape memory Nitinol. The coating may be applied using any variety of means known in the art generally referred to herein. The lubricious phenoxy resin coating may be limited to specific locations on the implant device, or the implant device may be entirely coated with phenoxy resin having lubricious additive. Furthermore, lubricious additive may be used in combination with radio-opaque additive to create a multipurpose phenoxy resin coating.

For impregnated phenoxy resin coatings related to medical devices there is also the advantage that phenoxy resin's affinity to form strong bonds is true for both the impregnated material and the surface of the substrate material, meaning that the impregnated material is securely retained within the phenoxy resin coating and the phenoxy resin coating is securely attached to the surface of the underlying substrate material.

Figure 6A:
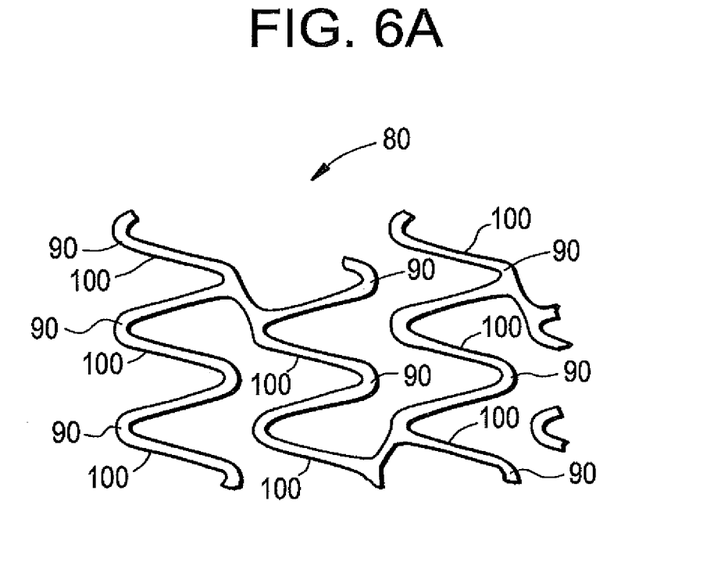
FIG. 6A is a schematic view of an exemplary intraluminal device having a phenoxy resin surface coating.
Figure 6B:
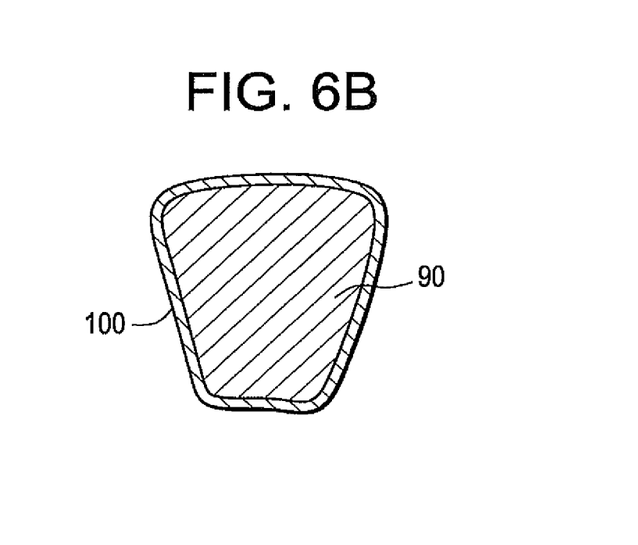
FIG. 6B is an enlarged sectional view of a structural element of the exemplary embodiment shown in FIG. 6A.

FIG. 6A and FIG. 6B illustrate, an intraluminal device 80 comprising a plurality of structural members 90 having a plurality of locations wherein phenoxy resin layer 100 is present. As previously described, the phenoxy layer 100 may include additives that improve the radio-opacity and/or surface lubricity of the implant.

Preferably, phenoxy resin layer 100 is prepared by dissolving phenoxy resin in to a polar solvent such as THF, MEK, dioxane, NMP, PM acetate, carbitol solvents, etc. The range of solid content may range from about 0.1% to about 99% per solubility of solvent. In one embodiment, a radio-opaque additive may be incorporated into the phenoxy resin prior to its application as phenoxy resin layer 100 onto the surface of structural member 90. The radioopaque additive, most preferably tantalum or bismuth but alternately any biocompatible material having radioopaque properties, may be in any form suitable for incorporation into the phenoxy resin however most preferably the additive is in powdered form. The phenoxy resin layer 100 may further comprise additives that improve the surface lubricity of the implant. The lubricious additive, most preferably PTFE, may be in any form suitable for incorporation into the phenoxy resin but most preferably the additive is in powdered form.

The phenoxy resin layer 100 may be applied either in discrete locations along select structural members 90, or phenoxy resin layer may fully encapsulate some or all of structural members 90. The application of phenoxy resin layer 90 may be by any of the means well known in the art such as spray coating, powder coating, fluidized bed coating, and solution dipping. In addition, the radioopaque additive may be added to the phenoxy resin in combination with other additives including the lubricious additives described herein.

A further application for phenoxy resin in medical devices such as those made from Nitinol is to reduce the Faraday cage effects caused by metallic implants subjected to imaging procedures employing electromagnetic fields. A Faraday cage is an enclosure formed by conducting material. Such an enclosure blocks out external static electrical fields. An external static electrical field will cause the electrical charges within the conducting material to redistribute such that the field's effects are canceled within the in the cage's interior. This effect is used most often for its beneficial effects in protecting electronic equipment from electrostatic discharges. However, this same shielding effect is undesirable for obtaining high-resolution medical images within the enclosed space defined by a metallic medical implant. The inability of an electromagnetic field generated for medical imaging methods, such as magnetic resonance imaging (MRI), causes blacked out areas known as "artifacts" to be present within the area enclosed by the metallic implant. Artifacts cause difficulty observing and diagnosing conditions within such implanted devices.

Figure 7A:
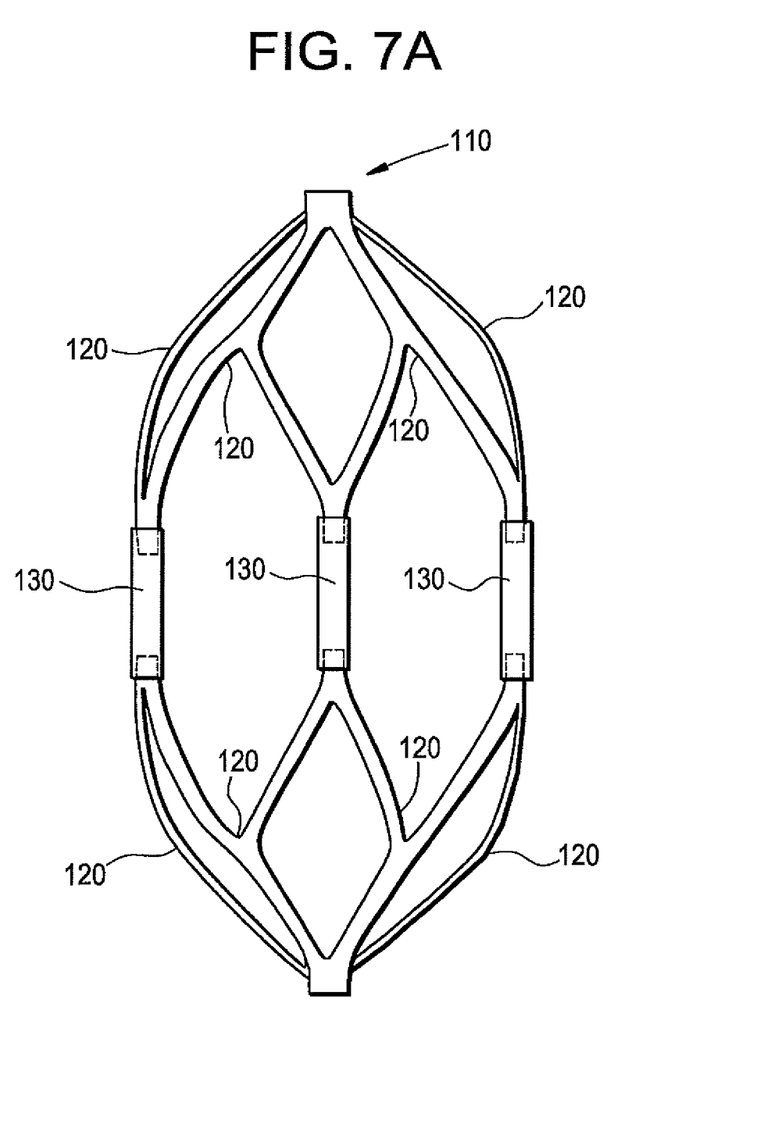
FIG. 7A is an exemplary embodiment of an intraluminal device.
Figure 7B:
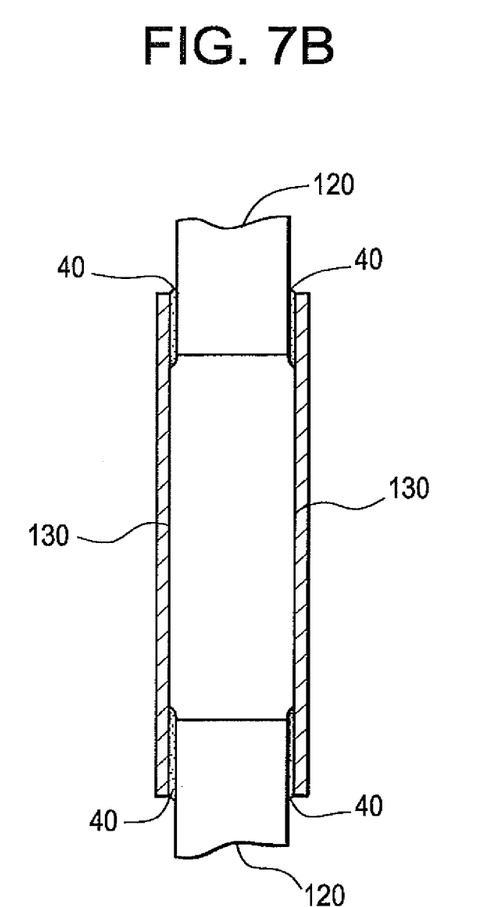
FIG. 7B is an enlarged sectional view of the exemplary embodiment shown in FIG. 7A.

In another exemplary embodiment shown in FIG. 7A and FIG. 7B, an intraluminal device 110, having a plurality of structural members 120 preferably comprised of superelastic Nitinol, has a middle structural section 130 comprised of a material that is heterogeneous from the composition of structural members 120. Preferably structural section 130 is comprised of tubular plastic such as PEEK. Structural section 130 is bonded at both ends to the structural members 120 with phenoxy resin layer 40 therebetween, such that a unitary structural middle section is formed. The bond region is most preferably a concentric lap joint wherein structural section 130 possesses a hollow cross section sized to allow the free ends of select structural members 120 to fit within the inner diameter of structural section 130 at both ends such that enough space remains for phenoxy resin layer 40 to be present between the outer surface of structural member 120 and the inner surface of structural section 130.

In the preferred exemplary embodiment of the intraluminal implant 110, the structural section 130 comprised of PEEK serves to disrupt the otherwise monolithic Nitinol composition of intraluminal implant 110 such that Faraday cage effects are preferably prevented when intraluminal implant 110 is exposed to magnetic fields such as those commonly associated with MRI. MRI artifacts are thereby reduced or avoided making it possible for medical images to be taken of the conditions inside of the intraluminal implant 110. Such imaging ability may be of particular importance for non-invasive detection of thrombus formation or stenosis, either of which may lead to stroke, embolism, ischemia, or heart attack.

Referring now to FIG. 9, the phenoxy resin chemical structure 140 possesses a hydroxyl functional group that has an affinity to form a bond to any substrate 180 having available surface oxygen coming from structures such as 150, 160, and 170. For example, as shown in FIG. 9A a carbon molecule 150 with available oxygen may allow for a hydrogen bond to form between hydroxyl functional groups in the phenoxy resin 140 and substrate 180, while the application of heat may strengthen the bond to a covalent polyester linkage 151 where excess oxygen and hydrogen are devolved as water 152. Alternately, as shown in FIG. 9B a hydrogen bond may form by the competition for the hydrogen electron in the hydroxyl functional group of phenoxy resin 140 and the surface oxygen 160 hydroxyl functional group 170 on substrate 180. As shown in FIG. 9C, with the addition of heat, hydroxyl functional group 170 and the hydroxyl function group of phenoxy resin 140 devolve excess hydrogen and oxygen to form water 172 thereby forming an ether linkage. Moreover, as suggested by FIG. 10, monomers or polymer unit structures such as PEEK unit structure 190 may form similar bonds to those described by chemical structures 150, 151, 160, 170, and 171.

For any of the embodiments contemplated herein, the strength of the bond formed by phenoxy resin may be increased through the application of heat, most preferably between about 100° C. and about 200° C., to form a covalent bond, or through the addition of cross linking agents to the phenoxy resin prior to application.

Furthermore, for any of the embodiments contemplated herein, phenoxy resin may be applied directly to the surface of the substrate material that is to be bonded or coated by phenoxy resin. The phenoxy resin may be in fluid form most preferably using the methods of spraying, dip coating, and fluidized bed.

Phenoxy resin may also be applied in dry form most preferably using the method of applying the phenoxy resin before applying heat (which causes the phenoxy resin to reflow and form a bond with the surfaces of the substrate or substrates). Any variety of means may be employed to apply the phenoxy resin in dry form, the most preferred means including pre-formed formats such as tubes which may further include co-extruded compositions, sheets, films, threads, micronized powder, and molded shapes which may further include co-injection or insert molding in order to capitalize on available process heat to drive phenoxy resin bond formation with the work piece. Dry methods of application may be most preferable where environmental considerations favor the reduced or eliminated use of solvents. By way of example for a bonding method, the use of a pre-formed phenoxy resin format to bond two tubes using a lap joint may be beneficial for multiple reasons. First, if the tubes are comprised of dissimilar materials, a strong bond may be created without using heat or relying on admixture of the substrates if one or both materials are thermally sensitive. Second, if the materials are chemically sensitive, including drug-containing coatings thereon, damage caused by the introduction of solvent may be avoided or minimized by applying phenoxy resin in dry form and applying heat in an amount necessary to cause the phenoxy resin to reflow and form a bond (preferably below 200 degrees Celsius but most preferably below 100 degrees Celsius). Third, ease of manufacture may be aided by sizing the joint to allow for a pre-formed phenoxy resin sleeve to be placed between the surfaces of the substrates forming the lap joint and subsequently applying heat using any of the methods known in the art, thereby decreasing the time and complexity of forming such a joint using a method employing liquid adhesive or epoxy. Fourth, the dimensional disruption or variation in diameter of the lumen formed at the inner diameter of the lap joint is minimized because the phenoxy resin is present in a predetermined amount thereby controlling the possibility of excessive bonding material and improving the dimensional uniformity of the lap joint. Fifth, by using a pre-formed format the uniformity of the presence phenoxy resin is enhanced and bond strength is improved thereby.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope for the appended claims.

What is claimed is:

1. A medical device comprising:
a first member made from nitinol having a first surface with an available surface oxygen;
a second member made from nitinol having a second surface with an available surface oxygen;
a bonding agent comprised of polyhydroxyl ether having a plurality of secondary hydroxyl functional groups with an affinity to form hydrogen bonds with oxygen, the bonding agent being cooperatively associated with the first member and the second member in such a manner as to cause the bonding agent to contact the first surface and the second surface, the bonding agent configured to affix the first member relative to the second member by forming a covalent bond between the available surface oxygen on the first and the second surfaces and the hydroxyl functional groups of the bonding agent.

2. The medical device of claim 1 wherein at least one of the first member and the second member have an oxide surface.

3. The medical device of claim 2 wherein the oxide surface is a passivated oxide surface.

4. The medical device of claim 1 wherein the nitinol is in a martinsitic phase at zero applied stress.

5. The medical device of claim 4 wherein the nitinol has an $A_f$ temperature greater than about 37 degrees Celsius.

6. The medical device of claim 1 wherein the nitinol is in an austenitic phase at zero applied stress.

7. The medical device of claim 6 wherein the nitinol has an $A_f$ temperature between about 10 degrees Celsius and about 37 degrees Celsius.

8. The medical device of claim 1 wherein the polyhydroxyl ether is a phenoxy resin.

* * * * *